United States Patent
Fuentes Domingo et al.

(10) Patent No.: US 8,790,056 B2
(45) Date of Patent: Jul. 29, 2014

(54) REMOVABLE AND REUSABLE QUICK NUT

(75) Inventors: Ismael Fuentes Domingo, Barcelona (ES); Isaac Tejero Salinero, Barcelona (ES); Raul Ortega Dona, Barcelona (ES)

(73) Assignee: Illinois Tool Works Inc., Glenview, IL (US)

( * ) Notice: Subject to any disclaimer, the term of this patent is extended or adjusted under 35 U.S.C. 154(b) by 161 days.

(21) Appl. No.: 13/505,997

(22) PCT Filed: Nov. 4, 2010

(86) PCT No.: PCT/US2010/055410
§ 371 (c)(1), (2), (4) Date: May 3, 2012

(87) PCT Pub. No.: WO2011/056943
PCT Pub. Date: May 12, 2011

(65) Prior Publication Data
US 2012/0219381 A1    Aug. 30, 2012

(30) Foreign Application Priority Data
Nov. 4, 2009  (ES) .................................. 200902165

(51) Int. Cl.
*F16B 37/04*  (2006.01)
*F16B 37/02*  (2006.01)
*F16B 39/14*  (2006.01)

(52) U.S. Cl.
CPC ............... *F16B 37/043* (2013.01); *F16B 37/02* (2013.01); *F16B 39/14* (2013.01); *Y10S 411/97* (2013.01)

USPC ............................................ 411/173; 411/970

(58) Field of Classification Search
USPC ................... 411/61, 182, 173, 970; 24/295
See application file for complete search history.

(56) References Cited

U.S. PATENT DOCUMENTS

| | | | | |
|---|---|---|---|---|
| 2,707,013 | A | * | 4/1955 | Flora et al. .................... 411/173 |
| 4,595,325 | A | * | 6/1986 | Moran et al. .................... 411/173 |
| 4,610,588 | A | * | 9/1986 | Van Buren et al. ............ 411/173 |
| 5,829,934 | A | * | 11/1998 | Danby et al. .................. 411/182 |
| 5,873,690 | A | * | 2/1999 | Danby et al. ..................... 411/55 |

(Continued)

FOREIGN PATENT DOCUMENTS

| | | |
|---|---|---|
| DE | 102005060137 A1 | 6/2007 |
| EP | 1995097 A1 | 11/2008 |
| ES | 2259600 T3 | 10/2006 |
| WO | 2007087884 A1 | 8/2007 |

OTHER PUBLICATIONS

ISR for PCT/US2010/055410 dated Jan. 27, 2011.

*Primary Examiner* — Flemming Saether
(74) *Attorney, Agent, or Firm* — Lowe Hauptman & Ham LLP

(57) ABSTRACT

A REMOVABLE AND REUSABLE QUICK NUT, of the type used to fasten panels and/or accessories thereto, principally in the automobile industry, wherein on said nut, originating from a planar base, emerge individual opposite compression tabs that rise and fold toward an inner zone of the nut and that, by means of another fold, invert their direction in order on the outside to return to the height of the base, forming joining surfaces; from said surfaces there originate individual lugs or fins that, by means of successive folds, converge toward the inner zone of the nut in a position designed to engage with the screw thread of the screw for fastening the nut.

10 Claims, 2 Drawing Sheets

(56) References Cited

U.S. PATENT DOCUMENTS

| | | |
|---|---|---|
| 6,095,734 A | 8/2000 | Postadan et al. |
| 7,168,138 B2 | 1/2007 | Lubera et al. |
| 7,568,870 B2 | 8/2009 | Paquet |
| 7,640,635 B2 | 1/2010 | Kim et al. |
| 7,874,775 B2 * | 1/2011 | Hullmann et al. ............ 411/173 |
| 8,016,530 B2 | 9/2011 | Johnson et al. |
| 2001/0032377 A1 | 10/2001 | Lubera et al. |
| 2001/0046426 A1 | 11/2001 | Lubera et al. |
| 2008/0260490 A1 | 10/2008 | Motsch et al. |

* cited by examiner

REMOVABLE AND REUSABLE QUICK NUT

RELATED APPLICATIONS

The present application is national phase of PCT/US2010/055410 filed Nov. 4, 2010, and claims priority from Spanish Application Number P 200902165 filed Nov. 4, 2009.

FIELD OF THE INVENTION

The subject of the present invention is a removable and reusable quick nut, of the type used to fasten panels and accessories thereto, principally in the automobile-production industry, wherein a clip nut has been produced that allows same to work with a greater number of panel thicknesses, to which the nut suitably adapts, the special geometry thereof allowing high fastening levels once installed and greater ease of installation thereof.

BACKGROUND

Nuts or clips that, in the automobile industry, for example, are used to fasten panels and/or to fasten accessories to said panels are widely used. The type of nut to which the present invention refers work in a blind hole, previously made in the panels to be joined, into which the nut is inserted, a screw being that which ultimately gives rise to final locking of the nut and, as appropriate, of the elements to be joined or to be fastened to the panel.

For example, Spanish patent ES2259600 describes a clip nut of this type in which, originating from a planar base, a cylindrical sleeve is formed for the passage of the fastening screw, while, laterally, there emerge from said base surface individual opposite tabs converging toward an inner midpoint, the direction thereof then being inverted, said tabs descending, and extending, in accordance with each embodiment, as one or two tongues, the principal tongue retaining the panel and a second tongue engaging with the screw thread of the fastening screw.

Patent WO2007087884 is also known, which describes a nut of this type in which, originating from a planar base that has a threaded cylindrical passage for the passage of the fastening screw, there extend from said base individual tabs that converge toward an inner point, surfaces for contact with the screw being configured at the end of said tabs; from the inner end of said tabs, in the opposite direction than that of formation thereof, there descend independent fins that, by means of an elbow, produce locking to the panel, there being tongues in an inward direction for engaging with the screw thread of the fastening screw that, upon opening or relaxing through the action of the passage or withdrawal of the screw, give rise to or release the fastening of the nut on the panel.

This type of nut usually suffers from the problem that said nuts, owing to the way in which they are constructed, can be used satisfactorily only with a very narrow range of panel thicknesses. A further problem said nuts present is the low level of maneuverability when installing the clip on the panel. The improvement of these situations constitutes the principal object of the present invention.

A further objective pursued by the invention is, by virtue of an increase in the elastic performance of the piece, to facilitate preinstallation of the nut on the panel, a step prior to definitive fastening thereof upon insertion of the fastening nut. The actual form of the nut of the invention facilitates the insertion thereof and allows preliminary retention of the nut on the panel, thereby contributing to an enhancement of the ease of installation thereof.

These and further advantages of the present invention will become more apparent in the course of the description thereof.

BRIEF EXPLANATION OF THE INVENTION

The present invention describes a removable and reusable quick nut formed by originating from a base surface from which individual opposite tabs extend in a vertical direction in order to fold toward the inside, toward a convergent point but without ultimately touching, folding again and inverting their direction in order to descend to the outside and parallel to the previous tab, ending as a planar surface at the same level as the base of the nut.

From the center of the nut there also emerges a threaded cylinder for the passage of the screw for fastening the nut.

From said end surfaces of the tabs there emerge, toward the inner zone, by means of approximately rectilinear folds, two lugs ending as a curved surface, which are, in terms of height, spaced from one another by a small spacing equivalent to half a screw thread pitch of the fastening screw.

Said lugs are thus independent in terms of movements of the tabs of the nut, being designed as anti-collapse components by virtue of a reinforcement present on the surface thereof, which enhances the rigidity thereof.

In a premounting situation, the nut of the invention is held on the panel by virtue of the contact of the surface of the first part of the tabs of the nut against the edge of the hole in the panel. When the tightening screw is inserted, the lugs open toward the outside of the nut such that the first surface thereof progressively presses against the inner part of the panel, giving rise to the pinching thereof and to definitive fastening. When the screw is released, the lugs return elastically to their initial position, allowing easy extraction of the nut by means of a small pull thereon, which slides the tabs of the nut toward the outside of the panel, in a contraction toward the center of the nut that is possible by virtue of the elastic performance of said tabs as a result of the structural nature thereof.

In this way, a quick nut has been obtained that is convenient and easy to insert in the panel, even up to the point that it allows a premounting position without the use of any tool.

The piece has been designed in robust materials—in a preferred embodiment, using carbon steel—while, by virtue of the structural design thereof, it has a high elastic response, which greatly facilitates working with the piece and the functional recovery thereof once uninstalled.

BRIEF EXPLANATION OF THE DRAWINGS

For the purposes of a better understanding of the invention, two sheets of drawings are appended, which are provided purely by way of illustration and which in no way limit said invention.

DETAILED EXPLANATION OF THE INVENTION

Figure 1:
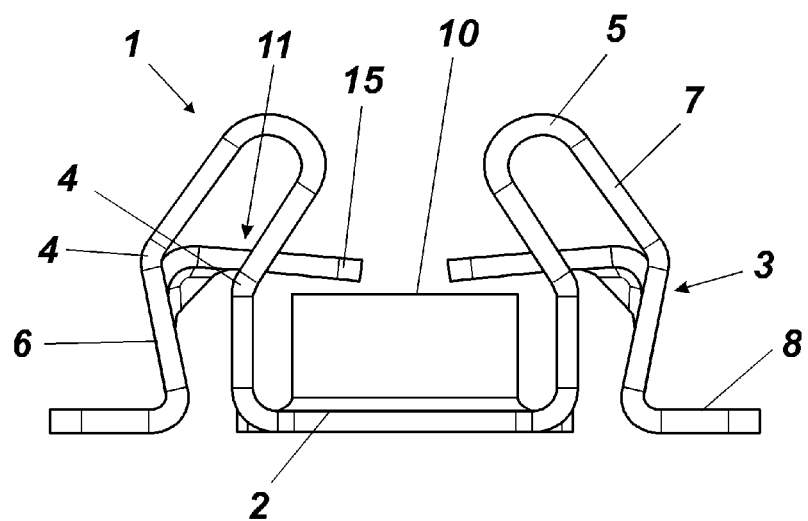
FIG. 1 shows a section in elevation of a representation of the preferred embodiment of the present invention.
Figure 2:
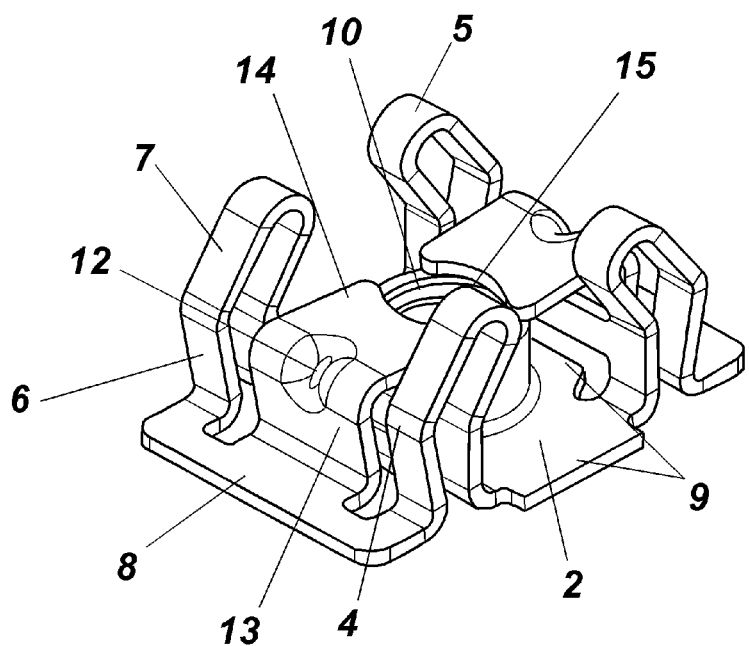
FIG. 2 shows a perspective view of the embodiment of the preceding figure.
Figure 3:
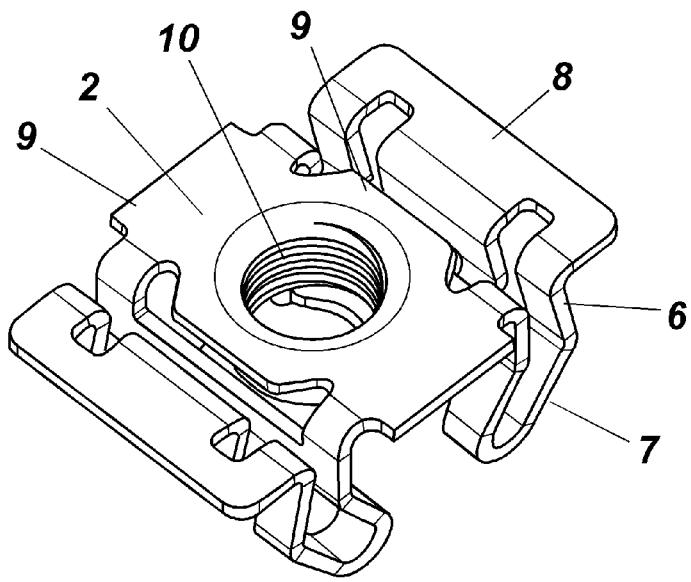
FIG. 3 shows a perspective that is the reverse of that of the preceding figure.

The present invention consists in a removable and reusable quick nut, of the type used to fasten panels and/or accessories thereto, principally in the automobile industry, wherein, from said nut (1), originating from a planar base (2), there emerge individual opposite compression tabs (3) that rise and fold (4) toward an inner zone of the nut and that, by means of another fold (5), invert their direction in order on the outside to return to the height of the base (2), forming joining surfaces (8).

The base (2) has, on its four sides, individual extensions (9) from its surface that increase the support of the nut (1) on the outer part of the panel to which they are to be fastened.

Figure 4:
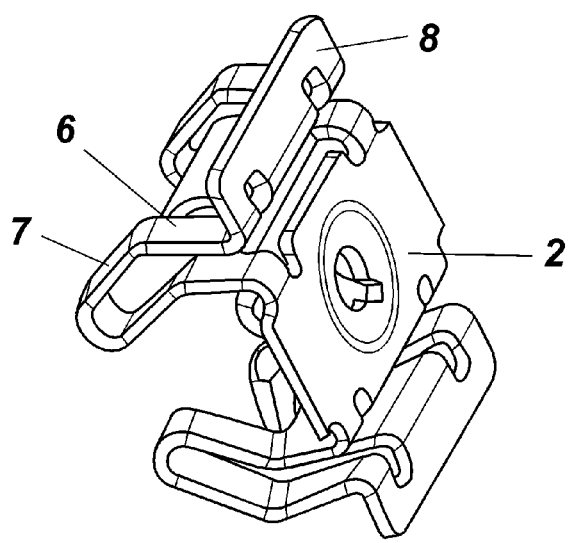
FIG. 4 shows a perspective representation of another of the possible embodiments of the invention, in which the screw thread for the passage of the fastening screw has a single thread.

In the preferred embodiment shown in the figures, from the center of said base there emerges a threaded cylinder (10) for the passage of a fastening screw. As an alternative, in other embodiments, such as that shown in FIG. 4, the invention envisages substituting said threaded cylinder (10) with a multi-thread screw thread with other means, such as a single-thread screw thread, or any other known means for engaging the fastening screw, with suitable efficacy of the tightening torque thereof, without this involving any modification of the essential nature of the invention.

The form of the tabs (3) that, in the upper portion (7) thereof, have a marked inclination that allows facilitated progressive entry of the nut in the installation hole in the panel is worthy of note. In addition, the first outer portion (6) of said tabs, designed to enter into contact with the edge of the panel, has a slight inclination that is the opposite of that of the second portion, with the result that it allows a first retention of the nut on the panel without the intervention of any tool.

Put simply, by means of the structural form of the nut of the invention, the user thereof lines it up with the window or hole in the panel, presses the nut (1) toward the inside thereof, such that it slides via said inclined second portions (7) of said tabs (3) against the edges of the panel, flexing elastically, in order, lastly, upon overriding the zone of the fold (4), to open again and to lock against said edges.

At this preinstallation point, the reverse operation, which consists in a small pull on the piece toward the outside of the panel, likewise removes it without the aid of any tool. The edges of the hole in the panel press the tabs (3) of the nut (1), contracting said tabs and allowing the sliding thereof as far as full extraction of the nut (1). This ease of insertion and extraction of the piece allows the functional reuse thereof since said operations do not give rise to any damage thereto.

From the surfaces (8) formed at the ends of the tabs (3) there originate individual lugs or fins (11) that, by means of successive folds, converge toward the inner zone of the nut in a position designed to engage with the screw thread of the screw for fastening the nut (1). In terms of height, the second portion (14) of said fins and the curved end surfaces (15) thereof have a spacing designed to facilitate operation with the fastening screw, said spacing being, for example, approximately the equivalent to half a pitch of the screw thread of said screw.

These fins (11) are designed as anti-collapse fins, having reinforcements (12) on the surface thereof that help to increase the structural rigidity thereof.

As shown in the figures, said fins are formed with two elbows, the first thereof, originating from the surface (8), defining a portion (13) that is slightly inclined outward, from the standpoint of the center of the nut (1), and that is responsible for the final fastening of the nut on the panel. In fact, when the fastening screw is inserted into the screw threaded cylinder (10), for example upon engagement of the screw threads thereof with the surfaces (15) of said fins (11), there arises an outward opening thereof that, as a result, gives rise to the elastic flexing thereof against the inner surface of the panel, which contact is achieved by said first portion (13) of said fins (11) and that gives rise to a tightening pinching against the panel in combination with the extended surfaces (9) of the base (2) and the joining surfaces (8) of the tabs (3).

In the preferred embodiments shown in the figures, said reinforcements (12) consist in a rib made on the fold located at the confluence of the two portions (13 and 14) of the fin (11). This rib is defined by a counter-sunk cavity or slit, the effect of which is to make the fin overall more rigid, enormously limiting the flexing of the portions (13 and 14). In this way, the expansion generated by the screw upon engagement at the curved end (15) of the fin (11) is transmitted fully along the fin until it gives rise to the compression of the edges of the hole in the panel. Alternatively, without a reinforcing rib (12), upon engagement of the screw the fin (11) would rise through the effect of the helical nature of the screw thread, only partially transmitting the expansion and consequently not ensuring secure retention of the nut on the panel.

It should be pointed out that said anti-collapse fins (11) flex independently of the tabs (3) and of the principal structure of the nut. At the same time, the tabs (3) of the nut—compression tabs—have a high elastic response on account of their configuration. The overall assembly allows the piece to be adapted to a high number of panel thicknesses, thereby increasing the range of application thereof.

As advantages of the invention, the result is consequently a nut that is removable from the panel and reusable.

"Removable" since, when the screw is no longer in engagement on the fins (11) but still threaded in the threads of the central cylinder (10), it is possible to pull on the screw and to remove the nut without giving rise to any damage either to the panel or to the actual nut (1). Furthermore, it is unnecessary to have recourse to any specific tool for this operation, it being possible, likewise, for mounting to be performed manually.

"Reusable" since the result of removal is not damaging to the nut.

A further advantage obtained with the nut of the invention arises from the structural simplicity thereof, a reduction in the material needed in its formation and also a reduction in its weight. All the aforesaid gives rise to a saving in terms of the manufacturing costs thereof.

It is understood that, in the present case, such details in terms of finishing and form that do not modify the essential nature of the invention may be varied.

The invention claimed is:

1. A REMOVABLE AND REUSABLE QUICK NUT, said nut being formed by a planar base from which emerge opposite tabs that form part of a means for fastening the nut to a panel, there being a screw threaded hole in a center of said base and said means for fastening the nut to the panel being actuated by an insertion of a fastening screw, CHARACTERIZED in that said tabs rise and fold toward an inner zone of the nut and, via a fold, invert their direction to the outside and return to the level of the base, forming joining surfaces;

there being defined, on said tabs, starting from said surfaces, an outwardly inclined lower portion of the nut, and via a fold, an inwardly inclined upper portion of the nut, said lower portion and said upper portion having opposite inclinations in a direction normal to the longitudinal axis of the screw thread hole;

from said surfaces, formed at the ends of said tabs, there originate individual lugs or fins that, via elbows, define, originating from the respective surfaces, a first portion slightly outwardly inclined from the standpoint of the center of the nut, and a second portion that converges toward the inner zone of the nut in a position designed to engage with the screw thread of the screw for fastening the nut.

2. THE REMOVABLE AND REUSABLE QUICK NUT as claimed in claim 1, CHARACTERIZED in that said fins are anti-collapse fins having reinforcements on a surface thereof that increase the structural rigidity thereof.

3. THE REMOVABLE AND REUSABLE QUICK NUT as claimed in claim 1, CHARACTERIZED in that said reinforcements are embodied as a rib made on the fold located at a confluence of the respective first portions and second portions of respective fins, defining a countersunk cavity or slit.

4. THE REMOVABLE AND REUSABLE QUICK NUT as claimed in claim 1, wherein the fins have respective curved end surfaces, and wherein in terms of height, the curved end surfaces of said fins have a spacing designed to facilitate operation with the fastening screw.

5. THE REMOVABLE AND REUSABLE QUICK NUT as claimed in claim 4, wherein said spacing being approximately the equivalent to half a screw thread pitch of said screw.

6. THE REMOVABLE AND REUSABLE QUICK NUT as claimed in claim 1, CHARACTERIZED in that said base has, on sides thereof, individual extensions from a surface that increase support of the nut on an outer surface of a panel to which they are to be fastened.

7. THE REMOVABLE AND REUSABLE QUICK NUT as claimed in claim 1, CHARACTERIZED in that the nut is produced from carbon steel.

8. THE REMOVABLE AND REUSABLE QUICK NUT as claimed in claim 1, CHARACTERIZED in that, from the center of said base, there emerges a threaded cylinder for the passage of a fastening screw.

9. THE REMOVABLE AND REUSABLE QUICK NUT as claimed in claim 1, CHARACTERIZED in that, from the center of said base, there emerges a single-thread screw threaded device.

10. THE REMOVABLE AND REUSABLE QUICK NUT as claimed in claim 1, wherein the removable and reusable quick nut is configured to fasten panels and/or accessories thereto.

* * * * *